United States Patent [19]
Graham

[11] 3,781,118
[45] Dec. 25, 1973

[54] SEDIMENTATION MEASURING DEVICE
[75] Inventor: Michael M. Graham, San Francisco, Calif.
[73] Assignee: The Heyman Laboratory, Cambridge, Mass.
[22] Filed: Oct. 27, 1972
[21] Appl. No.: 301,424

[52] U.S. Cl............. 356/201, 73/432 PS, 128/2 G, 210/521
[51] Int. Cl. .......................................... G01n 21/22
[58] Field of Search.................... 356/246, 206, 208, 356/197, 234, 201, 39; 73/53, 61; 209/111.7; 128/2 G

[56] References Cited
UNITED STATES PATENTS

| | | | |
|---|---|---|---|
| 2,725,782 | 12/1955 | Worley | 356/39 |
| 2,982,170 | 5/1961 | Wyss | 356/39 |
| 3,474,458 | 10/1969 | Standaart | 356/246 |
| 3,518,015 | 6/1970 | Hrdina | 356/246 |
| 3,554,702 | 1/1971 | Shanbrom et al. | 73/53 |
| 3,695,770 | 10/1972 | Granger | 356/201 |
| 3,497,690 | 2/1970 | Wheeless et al. | 250/71 R |
| 3,657,537 | 4/1972 | Wheeless et al. | 356/39 |

OTHER PUBLICATIONS
"Cancer Camouflage," R. Graham and J. Graham, Surgery, Gynecology and Obstetrics, Vol. 128, pp. 735–744 Apr., '69.
"Sedimentation Rates for Vaginal Cells," R. Graham, M. Graham, & J. Graham, Obstetrics & Gynecology, Vol. 31 (3), pp. 354–359 Mar., '68.
"Infotrak Card–Chart Recorder," Leeds of Northrup Catalog p. G – 15, 1972

Primary Examiner—Ronald L. Wibert
Assistant Examiner—Steven K. Morrison
Attorney—Robert A. Cesari et al.

[57] ABSTRACT
Novel apparatus and process for increasing the reliability of short term sedimentation tests such as those carried out by the measurement of light transmitted through a liquid bearing the falling sediment. A particular advantage of the invention is that it provides a simple and inexpensive means for measuring sedimentation rates on samples in test-tube-type containers without reliance on the care with which the container was filled.

16 Claims, 4 Drawing Figures

PATENTED DEC 25 1973  3,781,118

SEDIMENTATION MEASURING DEVICE

BACKGROUND OF THE INVENTION

This invention relates to apparatus for use in diagnostic screening by measurement of radiation transmitted through a physiologically-derived fluid. The measurement of light transmitted through physiologically-derived liquid to determine some property (say clotting rate, turbidity, sedimentation ratio, or the like) has been known for a long time. One such test method is generally described in articles by Ruth M. Graham, Michael M. Graham and John B. Graham in "Obstetrics and Gynecology," Vol. 31, No. 3, Mar. 1968, and by Ruth M. Graham and John Graham in "Surgery, Gynecology & Obstetrics," Vol. 128, Apr. 1969, pp. 735–744. In general, the test described in these articles describes how vaginal cells from diseased patients sediment more slowly than normal ones and how this phenomenon can be utilized as an effective screening tool in cancer diagnostic procedures.

In general, this test utilizes a gravity-induced sedimentation over a rather short time span, say, four to fifteen minutes, as the basis for establishing a sedimentation curve to be used as a basis for the diagnostic screening. A particular advantage of this fast, gravity-induced test is that it can be carried out on inexpensive equipment by technicians of ordinary skill and little training. One problem in carrying out a large number of tests of this nature wherein the samples are prepared and handled by a number of different people is that various people tend to have somewhat different techniques which affect the result of the test. This is true even when all the technicians exert care; however, when somewhat careless or tired employees are running the tests, even greater effects on the test results are realized.

Thus, the present inventor was faced with the problem of minimizing the possible area of error or deviation from standard procedures by test personnel.

SUMMARY OF THE INVENTION

Therefore, it is a primary object of the invention to provide a novel apparatus for carrying out sedimentation studies by use of radiation transmitted through a sample.

It is a particular object of the invention to provide apparatus useful in relatively short-term sedimentation studies wherein the sample to be studied initially is a substantially homogeneous dispersion of solids in liquid.

Another object of the invention is to provide an improved process for carrying out sedimentation studies over a relatively short term utilizing gravity.

Other objects of the invention will be obvious to those skilled in the art on reading this application.

The objects listed above have been substantially achieved by the construction of apparatus which assures that a constant head of sediment-containing liquid will be tested in each test. This construction is a consequence of the inventor's realization, on observation and experiment, that undesirable variations in testing procedures often resulted from test tubes being filled to different levels before being set into test apparatus. It was further observed that the gravitational response of a homogeneous relatively dilute test suspension used in a short-term, gravity-moderated suspension test required but a constant head of test liquid and was not substantially affected by any lateral movement of the suspended matter.

The novel apparatus of the invention, therefore, comprises a test tube receptacle placed between a light source and a light sensor adapted to measure light transmitted through a sample-containing test tube. The test tube receptacle is so placed with respect to a light beam travelling between the source and the sensor that the beam travels through liquid in the test tube when the test tube is so turned along the axis formed by the light beam that no gas liquid interface is experienced directly above the light beam; rather, the head of liquid above the light beam terminates at a glass wall of the test tube.

When the path of the light beam is arranged to pass through the lower portion of the test tube, it has been found that a very wide deviation in volume of test liquid can be experienced without any intolerable effect on the test over a given time period. The test has been found to be advantageously performed using a low cost polychromatic source and a simple infra-red absorbing means between the light source and sample being tested.

It will be evident that a wide range of operative angles can be selected for placement of the test tubes with respect to the axial line of the light path. The precise angle to be selected will depend on the exact position of the light beam through the test tube and the exact range of test liquid volumes which one feels one must provide for in a particular design. However, an angle of about 30° to 60° is preferred for most purposes. The important consideration is that once the angle and the position of the light path are selected, the liquid in the tube must reach that point on the upper wall of the tube which is directly above the light path. Stated another way, a vertical plane in the test tube running from that juncture of the upper inner container wall, gas, and liquid which is nearest the light path must interpose between the light path and top of the tube.

It is necessary in practice of the invention to avoid any minor disturbance in the liquid being tested which disturbance will promote substantial lateral movement of the sediment. Thus thermal convection is to be avoided. One advantageous procedure for achieving this in the apparatus of the invention is to assure adequate thermal insulation between the light source and the test tube containing the sample to be tested.

In one embodiment of the invention, a recording means is incorporated into the same module with the angled test cells. It has been found advantageous to utilize a recording means which complements the particular advantages of the testing procedure, i.e., speedy processing of dependable individual samples.

To this end, a chart recorder is utilized with an individual record-card acceptor. Individual record cards may be obtained on completion of each test. A readout on the card is achieved by recording thereon a signal proportioned to the voltage induced in the photoresistor of a measuring circuit. The card can then be removed and used immediately in diagnostic reporting procedures.

The apparatus described herein is particularly adapted for testing the sedimentation rate of vaginal cells as disclosed in the Graham et al. publications cited above under the section "Background of the Invention." In this test, the cells may be first collected and stored in a suspending medium of, say, 20 percent methyl alcohol, 74 percent saline, and 6 percent glacial acetic acid. Upon reaching the laboratory, they are centrifuged and the suspending medium is discarded and replaced with 95 percent alcohol. The cells are separated as by a dispersing apparatus sold under the trade designation Cyclomixer available from Clay-Adams Company of New York, N.Y. The resultant solution should be homogeneous and free of agglomerates. It will advantageously contain no more than about 10 percent of solids.

It should be appreciated on reading this application that the processes in which the apparatus of the invention find utility are ideally those wherein the lateral motion of solids caused by migration procedures is as harmful as lateral motion caused by any other condition. Thus the solvent should provide a good inter-particle insulation medium and the particles, or cells or whatever, should advantageously be present in no greater amount than 10 percent of the liquid dispersion being tested. Moreover, once achieving the foregoing criteria for a test, it is also advantageous for the meaningful application of these principles that the specific gravity difference between the settling particles and suspending liquid be large enough to carry out the test in short enough time to avoid any harmful tendency of particles to drift laterally. The best way to define this overall requirement is to state that the test should be one capable of yielding meaningful data over a period not exceeding about 1 hour, and, most advantageously not exceeding about 15 minutes of sedimentation.

ILLUSTRATIVE EMBODIMENT OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions are selected and included for purposes of illustration in order that others skilled in the art will more fully understand the invention and the principles thereof and will be able to modify it in a variety of forms, each as may be best suited in the condition of a particular case.

IN THE DRAWINGS

Figure 1:
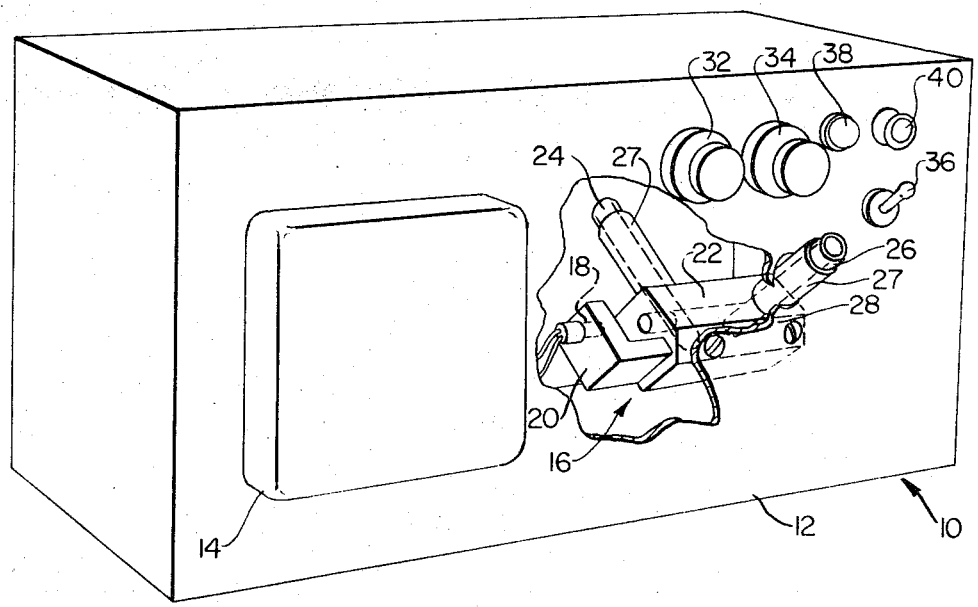
FIG. 1 is a perspective and somewhat schematic view of the apparatus of the invention.

Referring to FIG. 1, it is seen that sedimentation-rate testing apparatus 10 comprises a housing 12 containing a card-readout recorder 14 such as that sold under the trade designation Infotrak Card-Readout Recorder by Leeds & Northrup Company, and an optical sedimentation-measuring module generally indicated at 16.

Module 16 comprises a light source 18, held in bracket 20, a test tube positioning means comprising retainer member 22 and two test tubes. Tube 24 nearest light 18 contains water and forms means to absorb infra-red radiation incident from light 18. Tube 26 is the sample tube adapted to hold a dispersion of cells, the sedimentation rate of which is the subject of study. Each tube is snugly held in sleeves 27 of module 16. The infra-red energy absorbed by water in tube 24, were it not absorbed, could provide sufficient heat input to the sample being tested to interface with the test. This is so despite an only moderate output of energy from the light source. The light source is suitably rated at 24 volts and 0.036 amps and is a relatively wide spectrum.

Figure 2:
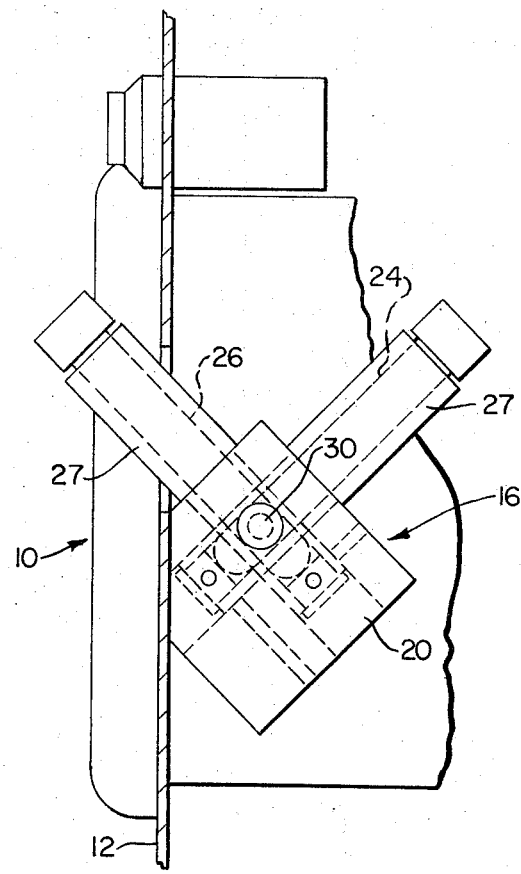
FIG. 2 is a side view of the test-tube-holding portion of the apparatus of FIG. 1.

A photosensitive detector means 28, suitably a photoresistor lies at the end of a light path 30 the position of which is shown in FIG. 2. As cellular material settles in tube 26, the amount of light reaching the detector means 28 will change and this will affect the detecting and measuring circuit shown in FIG. 3.

A number of control buttons including a sensitivity-selecting switch 32, a zero control 34, an off-on switch 36, an indicator light 38 and fuse-holder light 40 are shown on the face of the instrument, but the functions of such items are well known in the art and need not be discussed in detail.

Figure 3:
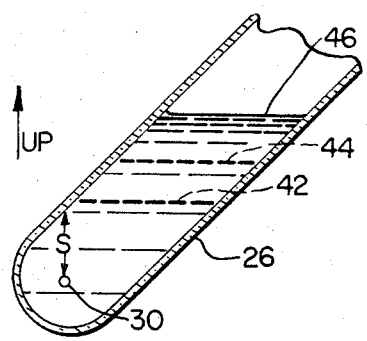
FIG. 3 is a side view of a tube used in the invention taken along the light path.

The particular advantage of arranging tube 26 at an angle with the light path is seen in FIG. 3 wherein the light path is conducted through apertures in tube holding means along a path 30. Path 30, when the tube is at a constant angle, has a constant head or distance S of homogeneous cell dispersion thereover despite the filling of the tube to different such liquid levels as 42, 44, 46 or whatever.

Figure 4:
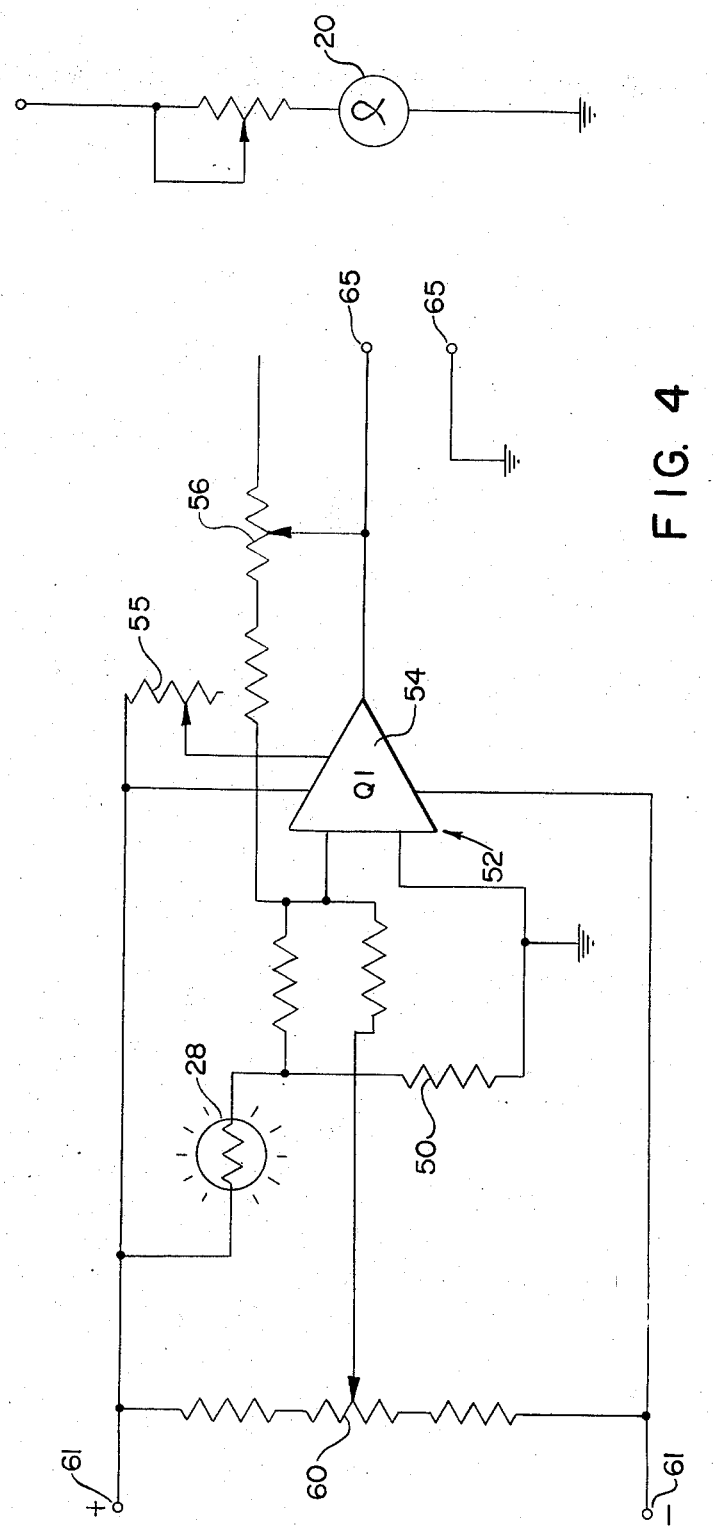
FIG. 4 is a schematic diagram of a circuit useful with the invention.

Referring now to FIG. 4, it is seen that the photodetector 28 on being actuated by light 20 will manifest a drop in its resistivity as the amount of light incident thereon increases. This drop in resistivity will cause an increase in current through that part of the circuit containing resistor 50. It is this change in the circuit that is measured through an amplifying circuit generally indicated at 52 utilizing an operational amplifier 54 containing potentiometer means 55. Variable resistor 56 is primarily a sensitivity calibrating means only, operated by knob 32 shown on FIG. 1. Variable resistor 60 is generally changed by movement of the zero dial 34 as shown in FIG. 1. In other respects, the circuit is run from a regulated power supply. The amplifier-circuit-processed signal is fed into the recorder 14 from terminals 65.

It is also to be understood that the following claims are intended to cover all of the generic and specific features of the invention herein described and all statements of the scope of the invention which might be said to fall therebetween.

I claim:

1. In a sedimentation-monitoring test apparatus of the type that comprises a light source, means to define a substantially horizontal light path, a light-measuring means, and a receptacle intercepting said light path between said light source and measuring means, said receptacle adapted to receive an elongate test tube of a homogeneous dispersion of particulate matter for testing, the improvement wherein said receptacle forms means adapted to hold said test tube so that the axis of said test tube intersects said light path at a right angle and is pivoted about said light path to form a substantial angle between a vertical line passing through said intersection and the axis of the test tube and said light path to provide a constant head of said homogeneous dispersion over said light path, whereby said particulate matter of said homogeneous dispersion falls vertically through said light path.

2. Apparatus as defined in claim 1 wherein said angle is from 30 to 60 angular degrees.

3. Apparatus as defined in claim 1 wherein said container is so positioned between said source and said measuring means that said light path is adapted to pass proximate the bottom of the test tube at a distance less than about one-fourth of the distance along the axis of the test tube.

4. Apparatus as defined in claim 2 wherein said container so positioned between said source and said measuring means that the light path is adapted to fall proximate the bottom of the test tube at a distance less than about one-fourth of the distance along the axis of the test tube.

5. Apparatus as defined in claim 1, said apparatus integrated into a module with a recording means responsive to said light measuring means and also comprising means adapted to receive and hold individually-removable recording card in a pre-determined position with respect to said recording means.

6. Apparatus as defined in claim 5 wherein the time of travel of said recording means across said chart is less than about 15 minutes.

7. Apparatus as defined in claim 4, said apparatus integrated into a module with a recording means responsive to said light measuring means and also comprising means adapted to receive and hold individual removable recording card in a pre-determined position, with respect to said recording means.

8. Apparatus as defined in claim 7 wherein the time of travel of said recording means across said chart is less than about 15 minutes.

9. A process for measuring the sedimentation rates of homogeneous liquid-carried dispersions of particulate matter comprising the steps of
1. placing the dispersion in an elongate tube;
2. establishing a substantially horizontal light path;
3. placing said elongated tube in said light path
4. inclining said tube in a plane at an angle to said path to establish a constant head between the intersection of said light path and an upper wall of said inclined tube;
5. measuring the light transmitted through two apertures one on each side of said liquid, to determine the rate of sedimentation of particulate matter falling vertically through said light path.

10. A process as defined in claim 9 including maintaining said solids of said dispersion below 10 percent and limiting said measuring to a period of less than 15 minutes.

11. A process as defined in claim 9 including inclining said elongate tube at an angle of between 30 and 60°.

12. A process as defined in claim 10 including inclining said the elongate tube at an angle of between 30 and 60°.

13. A process as defined in claim 9 including positioning the elongated tube so that the light path falls through the lower 25 percent of said elongated tube.

14. A process as defined in claim 12 including positioning the elongated tube so that the light path falls through the lower 25 percent of said elongated tube.

15. A process as defined in claim 9 wherein the liquid being tested is a dispersion of vaginal cells.

16. A process as defined in claim 14 wherein the liquid being tested is a dispersion of vaginal cells.

* * * * *